(12) United States Patent
Hosaka et al.

(10) Patent No.: US 9,902,462 B2
(45) Date of Patent: Feb. 27, 2018

(54) CONTROLLER FOR DRIVING A MOTOR, AND ELECTRIC POWER ASSISTED VEHICLE

(71) Applicant: TAIYO YUDEN CO., LTD., Tokyo (JP)

(72) Inventors: Yasuo Hosaka, Gunma (JP); Kazuo Asanuma, Gunma (JP); Kuniaki Kawagoe, Gunma (JP); Satoru Shimizu, Gunma (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 130 days.

(21) Appl. No.: 14/882,174

(22) Filed: Oct. 13, 2015

(65) Prior Publication Data

US 2016/0107719 A1    Apr. 21, 2016

Related U.S. Application Data

(60) Provisional application No. 62/064,379, filed on Oct. 15, 2014.

(51) Int. Cl.
| | | |
|---|---|---|
| *B62M 6/00* | (2010.01) | |
| *B60L 7/10* | (2006.01) | |
| *B62M 6/45* | (2010.01) | |

(52) U.S. Cl.
CPC ............... *B62M 6/45* (2013.01); *B60L 7/10* (2013.01)

(58) Field of Classification Search
CPC ...... B60L 7/18; B60L 11/1801; B60L 11/007; B60L 2200/12; B60T 1/10; B60W 30/18127; B60W 10/00; B60W 10/08; B62M 6/90; B62M 6/50; B62M 6/60; B62M 6/45; B60Y 2200/12; Y02T 10/7005

See application file for complete search history.

(56) References Cited

U.S. PATENT DOCUMENTS

| | | | |
|---|---|---|---|
| 2004/0206563 A1 | 10/2004 | Murata | |
| 2012/0081080 A1* | 4/2012 | Aoki | ............... B62M 6/45 320/137 |

(Continued)

FOREIGN PATENT DOCUMENTS

| | | |
|---|---|---|
| EP | 0559231 A1 | 9/1993 |
| EP | 2 617 636 A1 | 7/2013 |

(Continued)

OTHER PUBLICATIONS

Taiwanese Office Action dated Dec. 17, 2015, in a counterpart Taiwanese patent application No. 103104465.

*Primary Examiner* — Jelani A Smith
(74) *Attorney, Agent, or Firm* — Chen Yoshimura LLP

(57) ABSTRACT

In one aspect, a controller for driving a motor of the present invention includes a driving control unit that controls driving of a motor, and a regenerative control unit that instructs the driving control unit to start regeneration when a signal from a pedal rotation sensor that detects a rotation direction of a pedal indicates that the rotation direction of the pedal is backwards, the regenerative control unit controlling an amount of the regeneration in accordance with a rotation amount of the pedal while the rotation direction of the pedal is backwards, the rotation amount being obtained by the pedal rotation sensor.

12 Claims, 16 Drawing Sheets

(56) References Cited

U.S. PATENT DOCUMENTS

| | | | |
|---|---|---|---|
| 2012/0239235 A1* | 9/2012 | Voigtlaender | B60L 7/18 701/22 |
| 2012/0241264 A1 | 9/2012 | Hosaka et al. | |
| 2014/0039742 A1 | 2/2014 | Tanaka et al. | |
| 2014/0121877 A1 | 5/2014 | Hosaka et al. | |

FOREIGN PATENT DOCUMENTS

| | | |
|---|---|---|
| JP | 2010-35376 A | 2/2010 |
| JP | 2011-83081 A | 4/2011 |
| JP | 2014-90539 A | 5/2014 |
| JP | 5666639 B2 | 2/2015 |
| TW | M244257 U | 9/2004 |
| TW | 200944426 A | 11/2009 |
| TW | 201231350 A | 8/2012 |
| TW | I371899 B | 9/2012 |
| WO | 2012/035682 A1 | 3/2012 |

* cited by examiner

CONTROLLER FOR DRIVING A MOTOR, AND ELECTRIC POWER ASSISTED VEHICLE

BACKGROUND OF THE INVENTION

Technical Field

The present invention relates to regenerative control technology for a motor.

Background Art

Electric power-assisted vehicles, such as electric bicycles driven by battery power, use sensors provided on brake levers. These sensors respond to the usage of the brakes by the rider in order to enable regenerative operation of the motor, which stores the kinetic energy of the vehicle into the battery and improves the travel distance of the vehicle.

Bicycles, unlike automobiles and motorcycles, do not have engine brakes, resulting in a sense of danger for the rider when descending long downward slopes at a high speed. Therefore, the speed must be controlled through operation of the brakes. There are problems, however, such as this kind of braking operation being bothersome for the rider, and hand fatigue occurring due to prolonged operation of the brakes.

Meanwhile, it is possible to control regenerative braking through operation of the brakes, but difficult to provide intended regenerative braking force by the rider due to the operation of the brakes being troublesome and due to ordinary brake operation detection devices only being able to detect two states: a state in which the brakes are being operated and a state in which the brakes are not being operated.

There is conventional technology that detects analog braking operation signals in accordance with the tension of the brake wire and brake lever, and then controls the regenerative braking force in accordance with this. There are problems, however, such as the brake wire stretching due to passage of time, mismatch between the operating point of the mechanical brakes and the braking operation amount controlling the regenerative braking force, and the mechanical brakes operating before efficient regenerative braking has occurred, thereby wasting the kinetic energy as heat.

There is also technology that automatically performs regenerative braking according to pre-determined configurations in electric power-assisted vehicles such as in electric bicycles; however, these pre-determined configurations do not necessarily coincide with the intentions of the rider. In other words, the speed at which a rider feels comfortable going down a long slope varies depending on road width, weather conditions, the physical condition of the rider, and the like, for example. Accordingly, depending on the rider, there may be a deceleration that is excessive enough to cause panic, or conversely an insufficient deceleration that causes the rider to feel a sense of danger.

RELATED DOCUMENTS

Patent Documents

Patent Document 1: Japanese Patent Application Laid-Open Publication No. 2010-35376.

Patent Document 2: Japanese Patent Application Laid-Open Publication No. 2011-83081.

SUMMARY OF THE INVENTION

Thus, one aspect of the present invention aims at providing a technology for enabling regenerative braking force that is consistent with the intentions of the rider. Accordingly, the present invention is directed to a scheme that substantially obviates one or more of the above-discussed and other problems due to limitations and disadvantages of the related art.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a controller for driving a motor, including: a driving control unit that controls driving of a motor; and a regenerative control unit that instructs the driving control unit to start regeneration when a signal received from a pedal rotation sensor that detects a rotation direction of a pedal indicates that the rotation direction of the pedal is backwards, the regenerative control unit controlling an amount of the regeneration in accordance with a rotation amount of the pedal while the rotation direction of the pedal is backwards, the rotation amount being obtained by the pedal rotation sensor. With this configuration, the rider can start regeneration with ease.

The regenerative control unit, after instructing the driving control unit to start regeneration, may instruct the driving control unit to stop regeneration when a signal received from the pedal rotation sensor indicates that the rotation direction of the pedal is forward. With this configuration, the rider can stop regeneration with ease.

The regenerative control unit, after instructing the driving control unit to start regeneration, may instruct the driving control unit to stop regeneration when a signal received from a torque sensor indicates that torque has been detected. This is because if regeneration continues when torque has been detected, the burden on the rider may increase.

The regenerative control unit may have a control coefficient calculation unit that, after the regenerative control unit instructs the driving control unit to start regeneration, calculates a control coefficient for a regeneration target amount in accordance with the rotation amount of the pedal and the rotation direction of the pedal obtained from the pedal rotation sensor, and the driving control unit may control driving of a motor in accordance with the regeneration target amount and the control coefficient. With this configuration, the rider can adjust the degree of regeneration as appropriate.

The regenerative control unit may have a control coefficient calculation unit that, after the regenerative control unit instructs the driving control unit to start regeneration, increases a control coefficient for a regeneration target amount in accordance with the rotation amount of the pedal obtained from the pedal rotation sensor when the rotation direction of the pedal obtained by the pedal rotation sensor is backwards, and decreases the control coefficient in accordance with the rotation amount of the pedal obtained by the pedal rotation sensor when the rotation direction of the pedal obtained from the pedal rotation sensor is forward, and the driving control unit may control driving of a motor in accordance with the regeneration target amount and the control coefficient. With this configuration, the rider can adjust the degree of regeneration as appropriate.

The regenerative control unit, after instructing the driving control unit to start regeneration, may instruct the driving control unit to stop regeneration when a signal has been received from a torque sensor indicating that torque has been detected. With this configuration, the burden on the rider can be decreased when propulsion is needed during adjustment of the regeneration control amount.

The pedal rotation sensor may be integrated with the torque sensor. In other words, there is no dependence on the form of the sensor. It is also possible to realize an electric power assisted vehicle including this type of controller for driving a motor.

Programs can be created for implementing such processes as described above on a microprocessor, and the programs are stored on a computer readable storage medium or storage device such as a floppy disk, an optical disc such as a CD-ROM, a magneto-optical disc, a semiconductor memory (ROM, for example), or a hard-disk, for example. Half-processed data is temporarily stored in a storage device such as RAM (Random Access Memory).

According to one aspect of the present invention, regenerative braking force is consistent with the intentions of the rider.

It is to be understood that both the foregoing general description and the following detailed description are exemplary and explanatory, and are intended to provide further explanation of the invention as claimed.

DETAILED DESCRIPTION OF EMBODIMENTS

Embodiment 1

Figure 1:
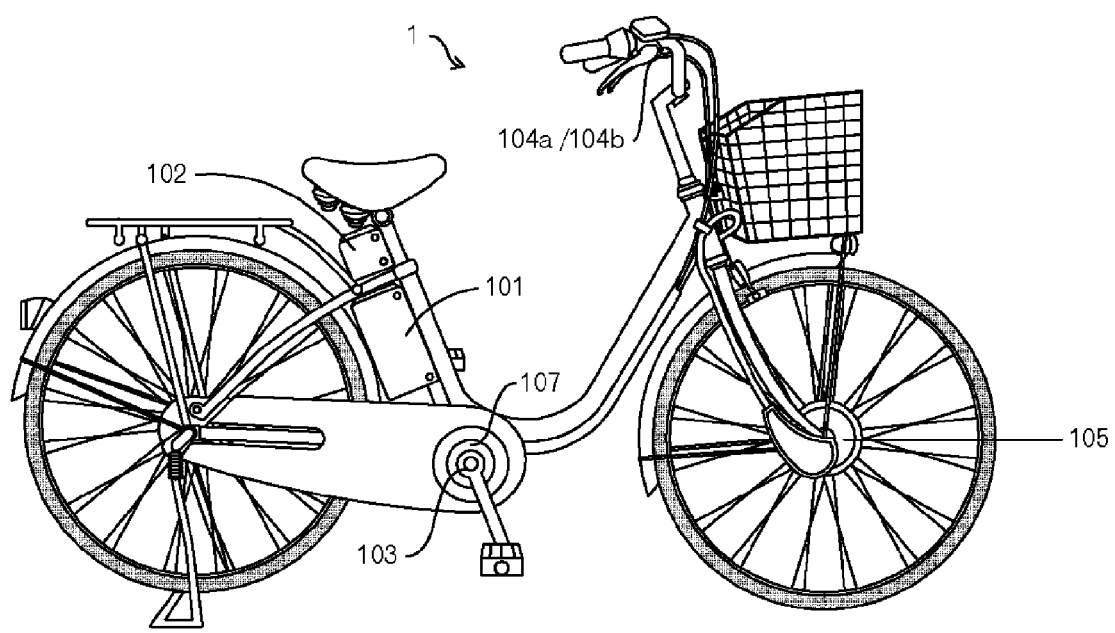
FIG. 1 is an external appearance of a bicycle with a motor attached thereto.

FIG. 1 is an external view of one example of a bicycle with a motor attached thereto of the present embodiment, which is an electric power-assisted vehicle. This motor-assisted bicycle 1 is equipped with a motor drive controller. The motor drive controller has a secondary cell 101, a controller for driving a motor 102, a torque sensor 103, brake sensors 104a and 104b, a motor 105, and a pedal rotation sensor 107. Although not shown in FIG. 1, the motor drive controller is sometimes provided with buttons or the like for enabling an exercise mode.

The secondary cell 101 is a lithium ion secondary cell with a maximum supply voltage (the voltage when fully charged) of 24V, for example. Other types of batteries, however, such as a lithium ion polymer secondary cell, a nickel-hydrogen storage battery, or the like may be used, for example.

The torque sensor 103 is provided on the wheel that is installed on the crankshaft, and detects the pedal force of the rider and outputs these detection results to the controller for driving a motor 102. The pedal rotation sensor 107 is provided on the wheel that is installed on the crankshaft, in a similar manner to the torque sensor 103, and outputs signals to the controller for driving a motor 102 in accordance with the rotations of the pedal. The pedal rotation sensor 107 can also detect the rotation direction of the pedal, such as forward or backwards, and the rotation phase angle.

The motor 105 is a three-phase brushless DC motor with a well-known configuration, for example, and is installed on the front wheel of the motor-assisted bicycle 1, for example. The motor 105 causes the front wheel to rotate, and a rotor is connected to the front wheel such that the rotor rotates in accordance with the rotation of the front wheel. The motor 105 has a rotation sensor such as a Hall element to output rotation information (namely, the Hall signal) of the rotor to the controller for driving a motor 102.

Figure 2:
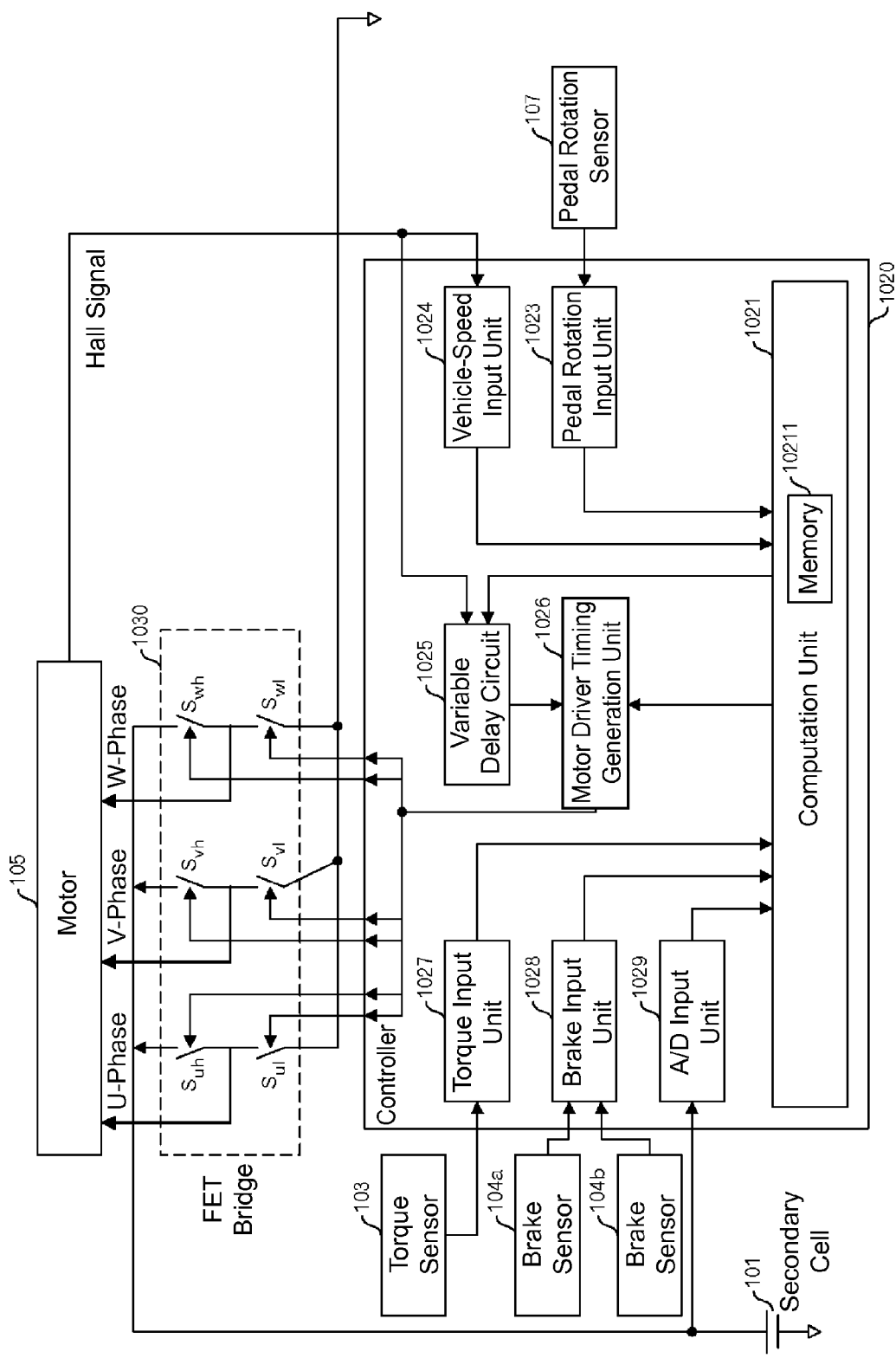
FIG. 2 is a function block diagram of a controller for driving a motor.

A configuration related to such the controller for driving a motor 102 of the motor-assisted bicycle 1 is shown in FIG. 2. The controller for driving a motor 102 has a controller 1020 and a FET (Field Effect Transistor) bridge 1030. The FET bridge 1030 contains: a high-side FET (Suh) and a low-side FET (Sul) that perform U-phase switching for the motor 105, a high-side FET (Svh) and a low-side FET (Svl) that perform V-phase switching for the motor 105, and a high-side FET (Swh) and a low-side FET (Swl) that perform W-phase switching for the motor 105. This FET bridge 1030 forms part of a complementary switching amp.

The controller 1020 has a computation unit 1021, a pedal rotation input unit 1023, a vehicle-speed input unit 1024, a variable delay circuit 1025, a motor driver timing generation unit 1026, a torque input unit 1027, a brake input unit 1028, and an AD input unit 1029.

The computation unit 1021 performs computations (described below) in accordance with input from the pedal rotation input unit 1023, input from the vehicle-speed input unit 1024, input from the torque input unit 1027, input from the brake input unit 1028, and input from the AD (Analog-Digital) input unit 1029, and then outputs the result to the motor driver timing generation unit 1026 and the variable delay circuit 1025. The computation unit 1021 has a memory 10211, and the memory 10211 stores various data, half-processed data, and the like for use in the computations. The computation unit 1021 may be realized by programs executed by a processor, and in such a case the programs may be recorded in the memory 10211.

The pedal rotation input unit 1023 digitizes signals from the pedal rotation sensor 107 indicating the pedal rotation phase angle and the rotation direction, and outputs the result to the computation unit 1021. The vehicle-speed input unit 1024 computes the current vehicle speed from the Hall signal outputted by the motor 105, and outputs the result to the computation unit 1021. The torque input unit 1027 digitizes a signal corresponding to the force from the torque sensor 103, and outputs the result to the computation unit 1021. The brake input unit 1028 outputs a signal to the computation unit 1021 in accordance with a signal from the brake sensors 104a and 104b indicating either a non-brake state where no ON signal has been received from either of the brake sensors 104a and 104b, or a brake state where an ON signal has been received from the brake sensor 104a or the brake sensor 104b. The AD input unit 1029 digitizes the output voltage from the secondary cell 101 and outputs the result to the computation unit 1021. The memory 10211 may be provided separately from the computation unit 1021.

The computation unit 1021 outputs a lead angle value as a result of the computations to the variable delay circuit 1025. The variable delay circuit 1025 adjusts the phase of the Hall signal on the basis of the lead angle value received from the computation unit 1021, and outputs the result to the motor driver timing generation unit 1026. As a result of the computations, the computation unit 1021 outputs a PWM (Pulse Width Modulation) code, which corresponds to the duty cycle of the PWM, to the motor driver timing generation unit 1026, for example. The motor driver timing generation unit 1026 generates and outputs switching signals for every FET included on the FET bridge 1030 on the basis of the post-adjusted Hall signal from the variable delay circuit 1025 and the PWM code from the computation unit 1021.

Figure 3:
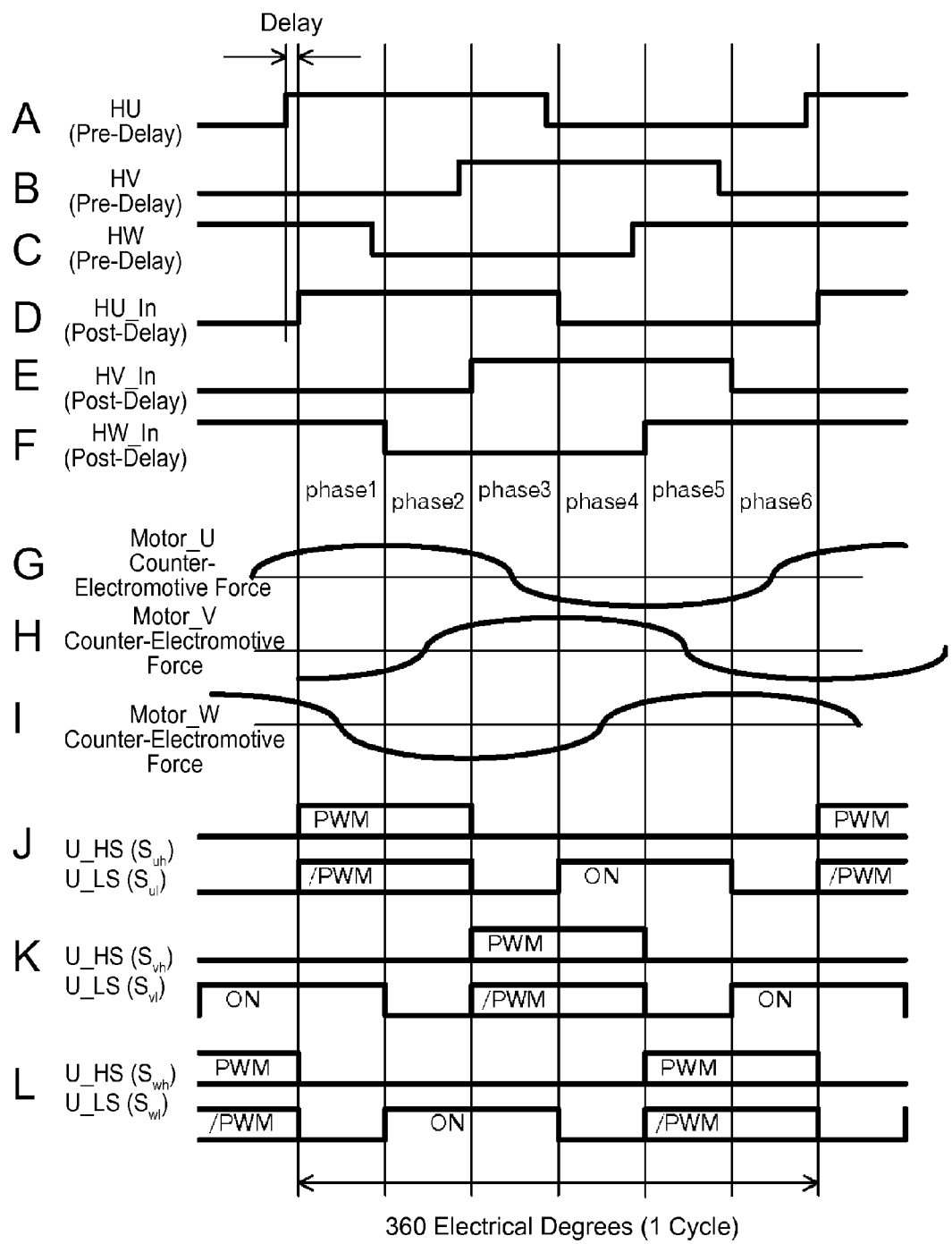
FIGS. 3A to 3L are waveform diagrams for explaining the basic operation of motor driver.

FIGS. 3A to 3L will be used to explain the basic motor drive operation with the configuration shown in FIG. 2. FIG. 3A indicates a U-phase Hall signal HU outputted by the motor 105, FIG. 3B indicates a V-phase Hall signal HV outputted by the motor 105, and FIG. 3C indicates a W-phase Hall signal HW outputted by the motor 105. As such, the Hall signal indicates the rotation phase of the motor. The rotation phase is not necessarily obtained as a continuous value here, and may be set to be obtained by other sensors or the like. As also described below, in the present embodiment, the Hall element of the motor 105 is placed such that the Hall signal, as shown in FIGS. 3A to 3C, is outputted at a slightly advanced phase, and is adjustable by the variable delay circuit 1025. Therefore, a post-adjusted U-phase Hall signal HU_In as shown in FIG. 3D is outputted from the variable delay circuit 1025 to the motor driver timing generation unit 1026, a post-adjusted V-phase Hall signal HV_In as shown in FIG. 3E is outputted from the variable delay circuit 1025 to the motor driver timing generation unit 1026, and a post-adjusted W-phase hole signal HW_In as shown in FIG. 3F is outputted from the variable delay circuit 1025 to the motor driver timing generation unit 1026.

One Hall signal cycle is divided into six phases of 360 electrical degrees.

As shown in FIGS. 3G to 3I, counter-electromotive force voltages occur, such as a Motor_U counter-electromotive force at the U-phase terminal, a Motor_V counter-electromotive force at the V-phase terminal, and a Motor_W counter-electromotive force at the W-phase terminal. In order to drive the motor 105 with a driving voltage that matches the phase of the motor counter-electromotive force voltage, a switching signal, such as shown in FIGS. 3J to 3L, is outputted to the gate of every FET on the FET bridge 1030. U_HS in FIG. 3J represents the gate signal for the U-phase high-side FET (Suh) and U_LS represents the gate signal for the U-phase low-side FET (Sul). PWM and [/PWM] represent the ON/OFF period in the duty cycle corresponding to the PWM code, which is the computational result from the computation unit 1021. This is a complementary type; thus, if PWM is ON then /PWM is OFF, and if PWM is OFF then /PWM is ON. The "ON" area of the low-side FET (Sul) is always ON. V_HS in FIG. 3K represents a gate signal of the V-phase high-side FET (Svh), and V_LS represents a gate signal of the V-phase low-side FET (Svl). The meaning of the characters is the same as in FIG. 3J. W_HS in FIG. 3L represents a gate signal of the W-phase high-side FET (Swh), and W_LS represents a gate signal of the W-phase low-side FET (Swl). The meaning of the characters is the same as in FIG. 3J.

As such, the U-phase FETs (Suh and Sul) perform PWM switching in phases 1 and 2, and the U-phase low-side FET (Sul) turns ON in phases 4 and 5. The V-phase FETs (Svh and Svl) perform PWM switching in phases 3 and 4, and the V-phase low-side FET (Svl) turns on in phases 6 and 1. The W-phase FETs (Swh and Swl) perform switching in phases 5 and 6, and the W-phase low-side FET (Swl) turns ON in phases 2 and 3.

If such signals are outputted to control suitably the duty cycle, then the motor 105 can be driven at the desired torque.

Figure 4:
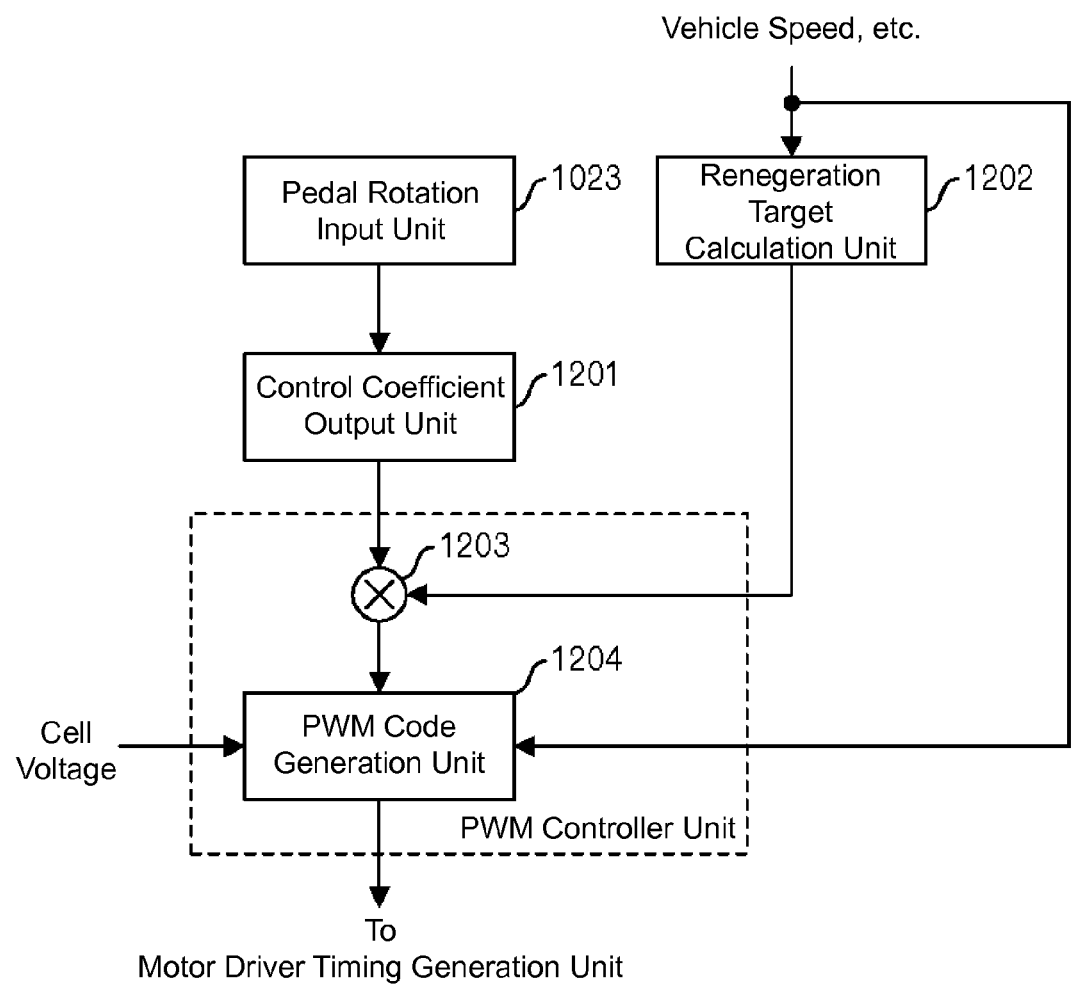
FIG. 4 is a block diagram of functions of a computation unit of Embodiment 1.

Next, a block diagram of functions of the computation unit 1021 of the present embodiment is shown in FIG. 4. As shown in FIG. 4, the computation unit 1021 has a control coefficient output unit 1201, a regeneration target calculation unit 1202, a multiplier 1203, and a PWM code generation unit 1204. The multiplier 1203 and the PWM code generation unit 1204 operate as the PWM control unit.

The control coefficient output unit 1201 outputs a control coefficient (described below) in accordance with the rotation direction of the pedal obtained from the pedal rotation input unit 1023, and outputs this control coefficient to the multiplier 1203. The regeneration target calculation unit 1202 calculates the regeneration target amount in accordance with the vehicle speed and the like from the vehicle-speed input unit 1024, and outputs the result to the multiplier 1203. The multiplier 1203 multiplies the control coefficient and the regeneration target amount and outputs the result of the multiplying to the PWM code generation unit 1204. The PWM code generation unit 1204 generates a PWM code corresponding to the PWM duty cycle on the basis of the output from the multiplier 1203, the vehicle speed, and the like, and outputs this PWM code to the motor driver timing generation unit 1026.

Figure 5:
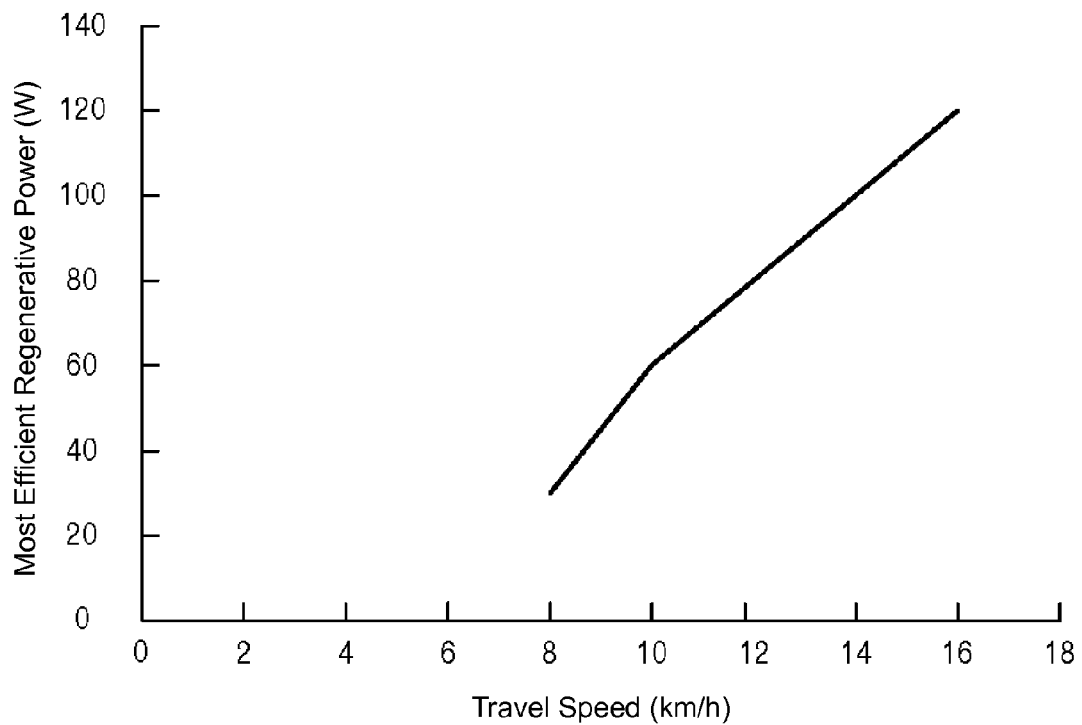
FIG. 5 is a view of the most efficient regenerative power for the given speeds.
Figure 6:
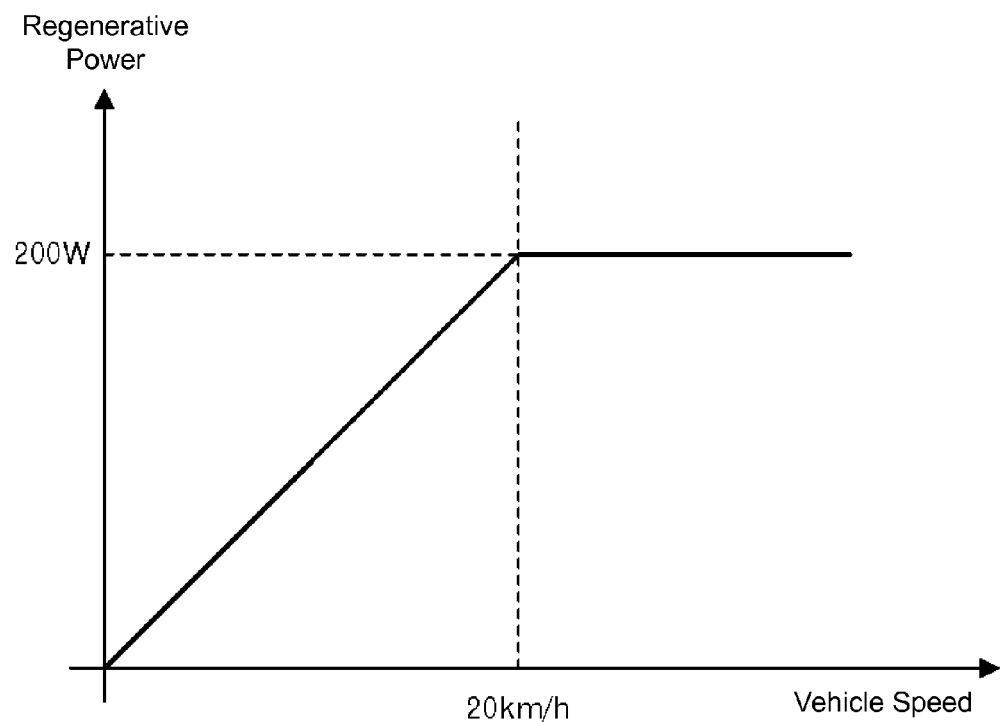
FIG. 6 is a view of the relationship between speed and target regeneration amount.

As described above, the regeneration target calculation unit 1202 computes the regeneration target amount according to vehicle speed and the like. As shown in FIG. 5, depending on the vehicle speed, there is a set power where regeneration efficiency is greatest, for example. As shown in FIG. 6, it is preferable that the regeneration target amount be configured in accordance with the vehicle speed, for example, such that this set power is generated. The regeneration target amount, however, is configured in the unit amounts used for the calculations in the PWM code generation unit 1204, such as for the power, duty cycle, torque, current amount and the like. If the calculations are done in torque units, then a relationship between the torque and vehicle speed that results in the maximum regeneration efficiency is identified ahead of time, and the regeneration target calculation unit 1202 computes the torque target amount in accordance with the current vehicle speed, for example. If the vehicle speed decreases due to braking, then the regeneration target amount also decreases. A curve as shown in FIG. 6 is one example of this, and the curve may be configured with motor, battery protection, or the like in mind.

The multiplier 1203 multiplies a control coefficient value C outputted from the control coefficient output unit 1201 with a regenerative target amount V outputted from the regeneration target calculation unit 1202, and outputs CxV to the PWM code generation unit 1204. The PWM code generation unit 1204 generates a PWM code based on the duty cycle and in accordance with the vehicle speed etc. and CxV. If V is torque, then CxV will also be torque; thus, the torque is converted into the PWM code by a conversion coefficient or the like on the basis of the torque CxV and the torque according to the vehicle speed, for example.

Figure 7:
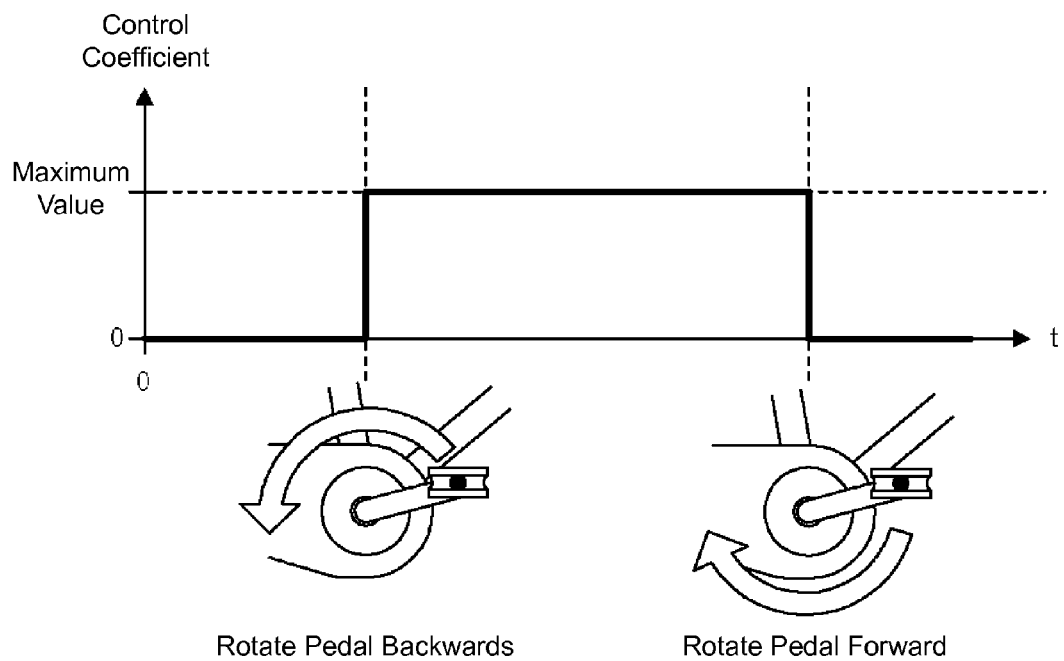
FIG. 7 is a view of one example of change over time of a control coefficient according to Embodiment 1.
Figure 8:
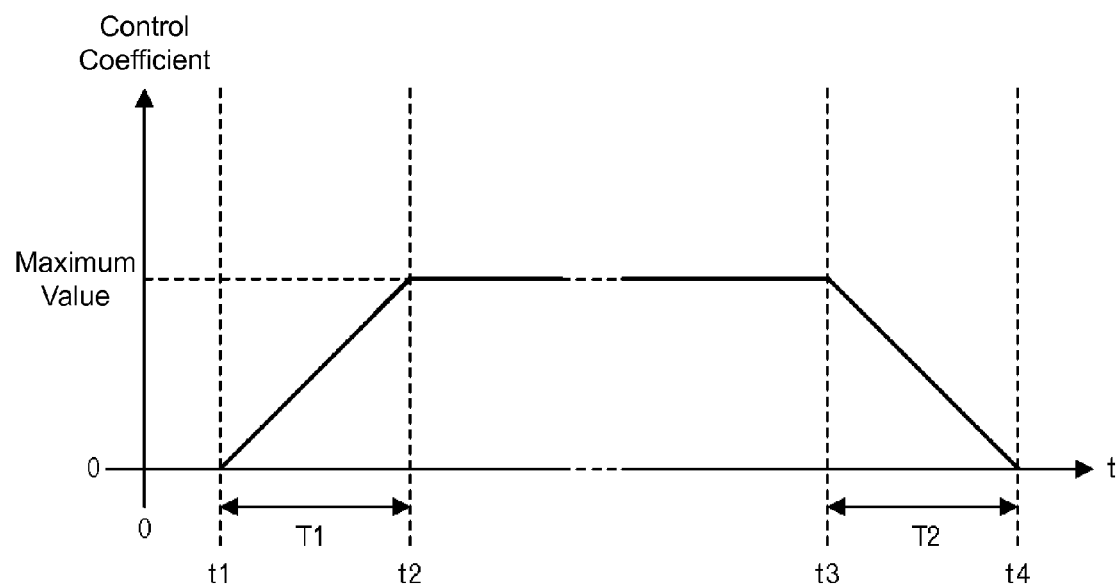
FIG. 8 is a view of one example of change over time of a control coefficient according to Embodiment 1.

Next, the control coefficient outputted by the control coefficient output unit 1201 will be described using FIGS. 7 and 8. FIG. 7 shows the relationship between time t and the control coefficient. In the present embodiment, when the pedal rotation input unit 1023 detects, on the basis of a signal from the pedal rotation sensor 107, that the rider has caused the pedal to rotate in the backwards direction, the control coefficient output unit 1201 sets the control coefficient at the maximum value. Thereafter, if the signal from the pedal rotation input unit 1023 indicates that the pedal is in a fixed position or is rotating in the backwards direction, the control coefficient output unit 1201 does not change the control coefficient value. Then, if it is detected that the rider has caused the pedal to rotate forward, the control coefficient output unit 1201 sets the control coefficient to 0. In this manner, the rider can easily designate ON and OFF regenerative operation in accordance with the rotation movement of the pedal.

The rider, however, will feel discomfort if the regenerative control amount is set to a large value from the start, or if the control suddenly sets the regenerative control amount to 0. Accordingly, as shown in FIG. 8, if the start of regenerative control is signaled at time t1, for example, then a slew rate control is preferable, such as one where the control coefficient value slowly rises only during interval T1 and then reaches the maximum value at time t2, for example. In a similar manner, even if the stop of regenerative control is signaled at time t3, a slew rate control, such as one where the control coefficient value is slowly decreased only during interval T2 and then reaches the minimum value at time t4, is preferable, for example.

In the present embodiment, the maximum value of the control coefficient is assumed to be "1," but a numerical value higher than "1" may be used. Depending on the circumstance, the maximum value of the control coefficient may be variable with time. The minimum value of the control coefficient is assumed to be "0," but a numerical value other than "0" may be used. Depending on the circumstance, the minimum value of the control coefficient may be variable with time.

As described above, in the present embodiment, regenerative operation can be started if backwards rotation of the pedal by the rider is detected, and regenerative operation can be stopped if forward rotation of the pedal is detected after the starting of regenerative operation. In other words, regenerative operation is performed in accordance with the intentions of the rider.

Embodiment 2

In Embodiment 1, an example was shown in which only ON and OFF are possible for regenerative operation, but in the present embodiment, it is possible to configure a regenerative control amount that is more in accordance with the intentions of the rider.

Figure 9:
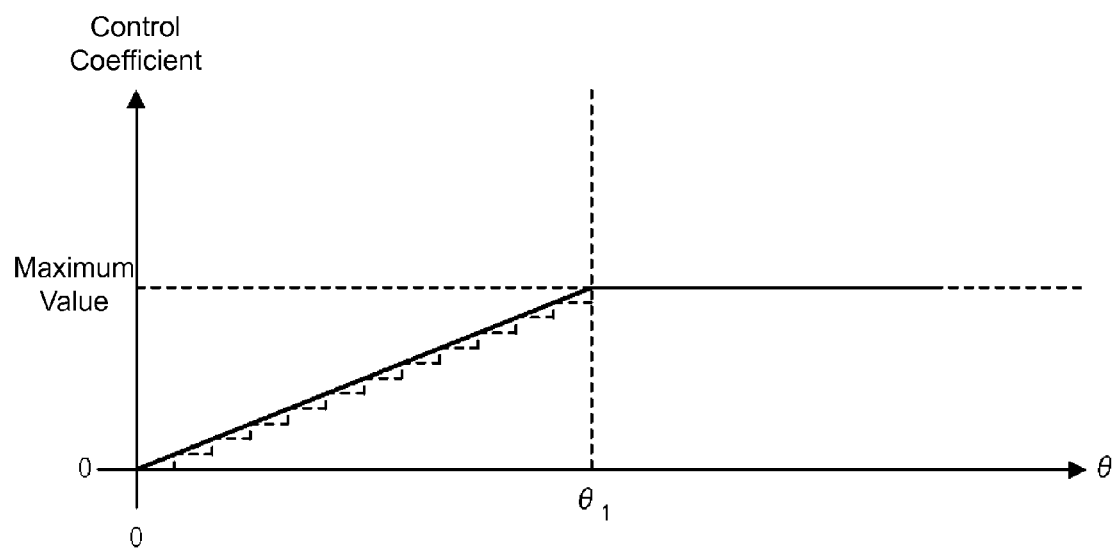
FIG. 9 is a view of the relationship between the control coefficient and the backwards pedal rotation accumulation amount according to Embodiment 2.

Specifically, control coefficients, such as shown in FIG. 9, are configured. Namely, in the example shown in FIG. 9, the horizontal axis represents the backwards pedal rotation accumulation amount (phase angle) θ, and the vertical axis represents the control coefficient. In this manner, until a set value θ1, the control coefficient increases proportionally to the increase in the backwards pedal rotation accumulation amount. The slope during this time is (control coefficient maximum value)/θ1. When the backwards pedal rotation accumulation amount reaches θ1 and the control coefficient arrives at the maximum value, the control coefficient is maintained at the maximum value even if the backwards pedal rotation accumulation amount increases. If the detection of the rotation phase angle by the pedal rotation sensor 107 is discrete, then the control coefficient stepwisely increases, as shown by the dotted lines. Meanwhile, if the rotation direction of the pedal switches to the forward direction, then the control coefficient is decreased so as to be proportional to the pedal rotation amount (phase angle) from that time.

Accordingly, to cause more regeneration to occur, the rider needs only to rotate the pedal backwards to match the desired extent, and to decrease the regenerative control amount after this, the rider needs only to rotate the pedals forward to match the desired extent.

It is not appropriate to cause regeneration to occur when a torque sensor 103 has detected torque; thus, torque detection by the torque sensor 103 is prioritized, and regenerative operation is made to stop.

Figure 10:
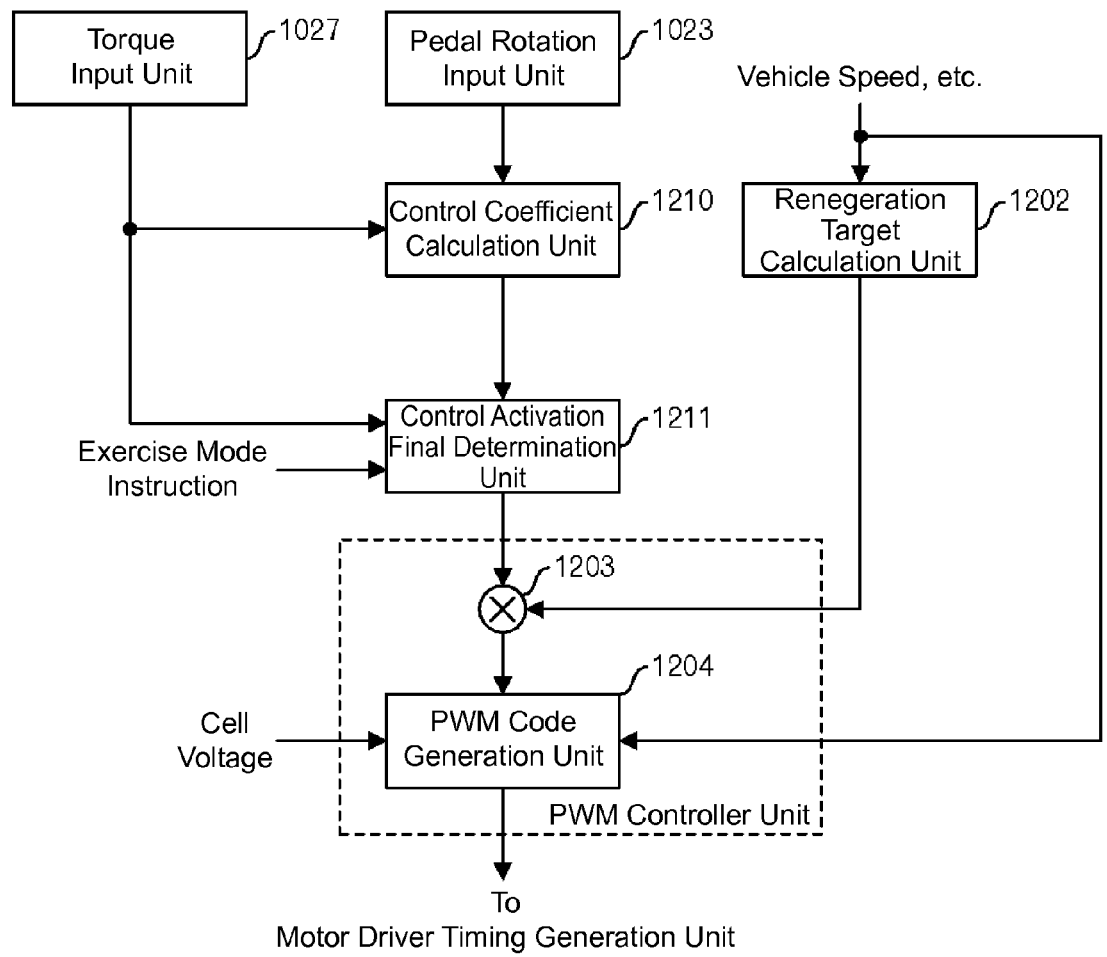
FIG. 10 is a block diagram of functions of a computation unit of Embodiment 2.

To make such an operation possible, a computation unit 1021 of the present embodiment has a configuration as shown in FIG. 10. The computation unit 1021 has a control coefficient calculation unit 1210, a regeneration target calculation unit 1202, a multiplier 1203, a PWM code generation unit 1204, and a control activation final determination unit 1211. The multiplier 1203 and the PWM code generation unit 1204 operate as the PWM control unit. The same reference characters are given to the constituting elements having the same function as in Embodiment 1.

The control coefficient calculation unit 1210 calculates a control coefficient (as described below) in accordance with a signal from a pedal rotation input unit 1023 indicating rotation direction and rotation phase angle, and a signal from the torque input unit 1027 indicating the presence or absence of torque. The control coefficient calculation unit 1210 outputs this control coefficient to the control activation final determination unit 1211. The control activation final determination unit 1211 determines whether to output the control coefficient from the control coefficient calculation unit 1210 to the multiplier 1203 in accordance with the signal from the torque input unit 1027 indicating the presence or absence of torque and an exercise mode indicator. This exercise mode indicator is inputted by the user from an operation panel or the like, for example, and indicates whether to unconditionally activate regeneration. Specifically, when an input indicating the presence of torque is received from the torque input unit 1027, the control activation final determination unit 1211 changes the control coefficient outputted from the control coefficient calculation unit 1210 to the minimum value (0, for example) and outputs this control coefficient. Meanwhile, if input indicating the absence of torque input is received, the control activation final determination unit 1211 outputs the control coefficient outputted from the control coefficient calculation unit 1210 without any changes. When there is an exercise mode indicator, or namely, when there is a mode whereby regeneration is deliberately performed even during torque input, the control activation final determination unit 1211 outputs the control coefficient outputted from the control coefficient calculation unit 1210 unchanged, even if there is torque input.

The regeneration target calculation unit 1202 calculates a target regeneration amount in accordance with vehicle speed or the like from a vehicle-speed input unit 1024, and then outputs this to the multiplier 1203. The multiplier 1203 multiplies the control coefficient with the regeneration target amount and outputs the product to the PWM code generation unit 1204.

The PWM code generation unit 1204 generates a PWM code corresponding to the PWM duty cycle on the basis of the output from the multiplier 1203, the vehicle speed, and the like, and outputs this PWM code to a motor driver timing generation unit 1026.

The multiplier 1203 multiplies a control coefficient value C outputted from the control activation final determination unit 1211 with a regeneration target amount V outputted from the regeneration target computing unit 1202, and outputs CxV to the PWM code generation unit 1204. The PWM code generation unit 1204 generates a PWM code based on the duty cycle and in accordance with the vehicle speed etc. and CxV. If V is torque, then CxV will also be torque; thus, the torque is converted into the PWM code by a conversion coefficient or the like on the basis of the torque CxV and the torque according to the vehicle speed, for example.

Figure 11:
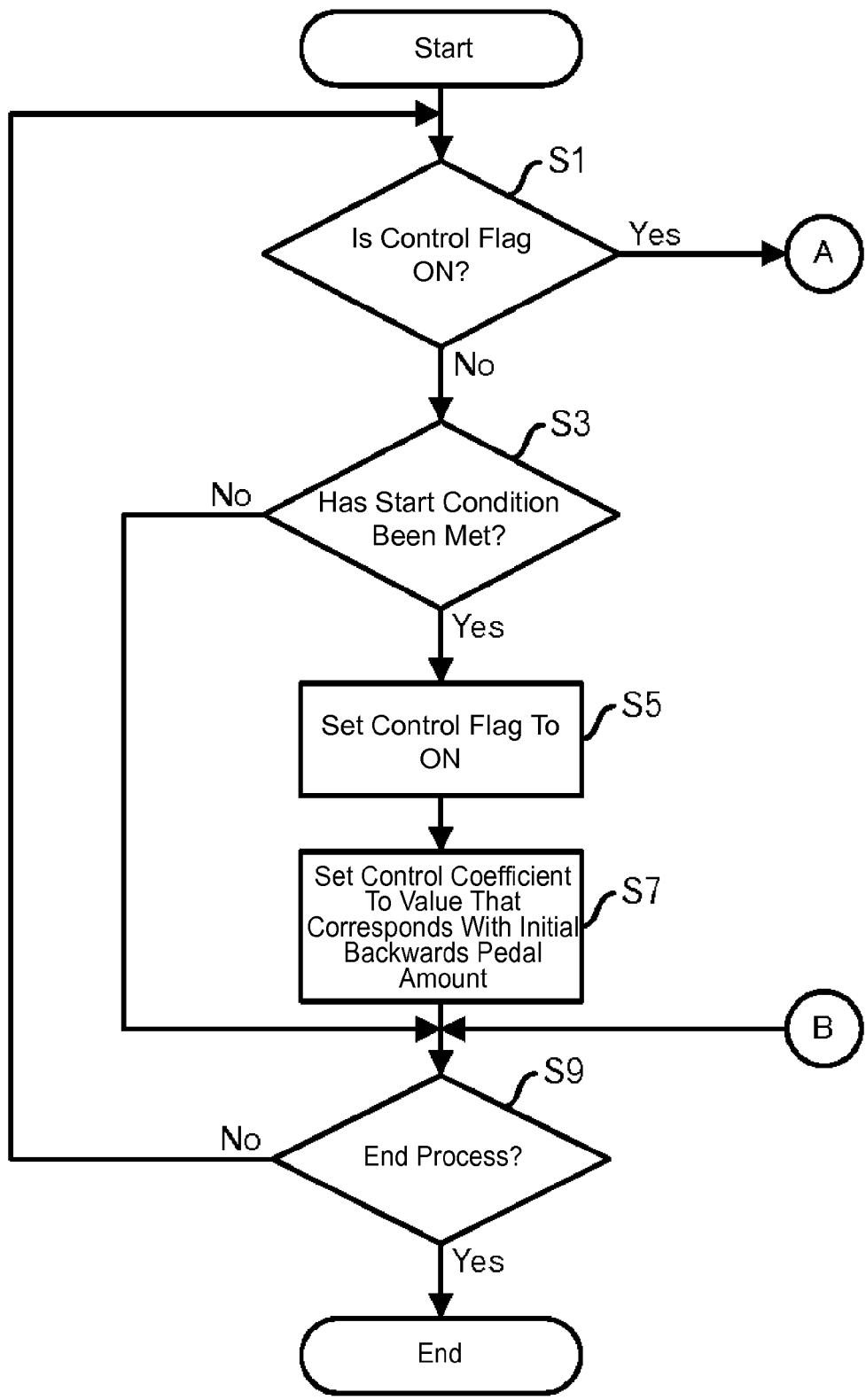
FIG. 11 is a view of a main process flow.

Next, a process flow of the control coefficient calculation unit 1210 will be explained using FIGS. 11 and 12. The control coefficient calculation unit 1210 determines whether a control flag is set to ON (FIG. 11: step S1). The control flag is set to ON when during regenerative control, and set to OFF when not during regenerative control. If the control flag is ON, then the process moves to the processes in FIG. 12 via a terminal A.

If the control flag is OFF, however, then the control coefficient calculation unit 1210 determines whether a start condition for regenerative control has been met (step S3). The start condition for regenerative control is the receiving of a signal from the pedal rotation input unit 1023 indicating that the pedal is undergoing backwards rotation. The signal from the torque input unit 1027 indicating an absence of torque is also a part of the start condition. If the start condition for regenerative control has not been met, then the process transitions to step S9.

Meanwhile, if the start condition for regenerative control has been met, then the control coefficient calculation unit 1210 sets the control flag to ON (step S5). The control coefficient calculation unit 1210 sets the control coefficient to a value corresponding to the initial backwards rotation amount (backwards rotation phase angle) received from the pedal rotation input unit 1023 (step S7). The process then transitions to step S9. This control coefficient value is outputted by the multiplier 1203, and the product of this control coefficient value and the regeneration target amount, which is the output from the regeneration target calculation unit 1201, is calculated. The product is then outputted to the PWM code generation unit 1204.

The control coefficient calculation unit 1210 determines whether it is appropriate to terminate the process (step S9). The control coefficient calculation unit 1210 determines whether a power OFF has been signaled by the rider, for example. If there is no process termination, then the process returns to step S1. However, if it is appropriate for the process is to be terminated, then the process is terminated.

Figure 12:
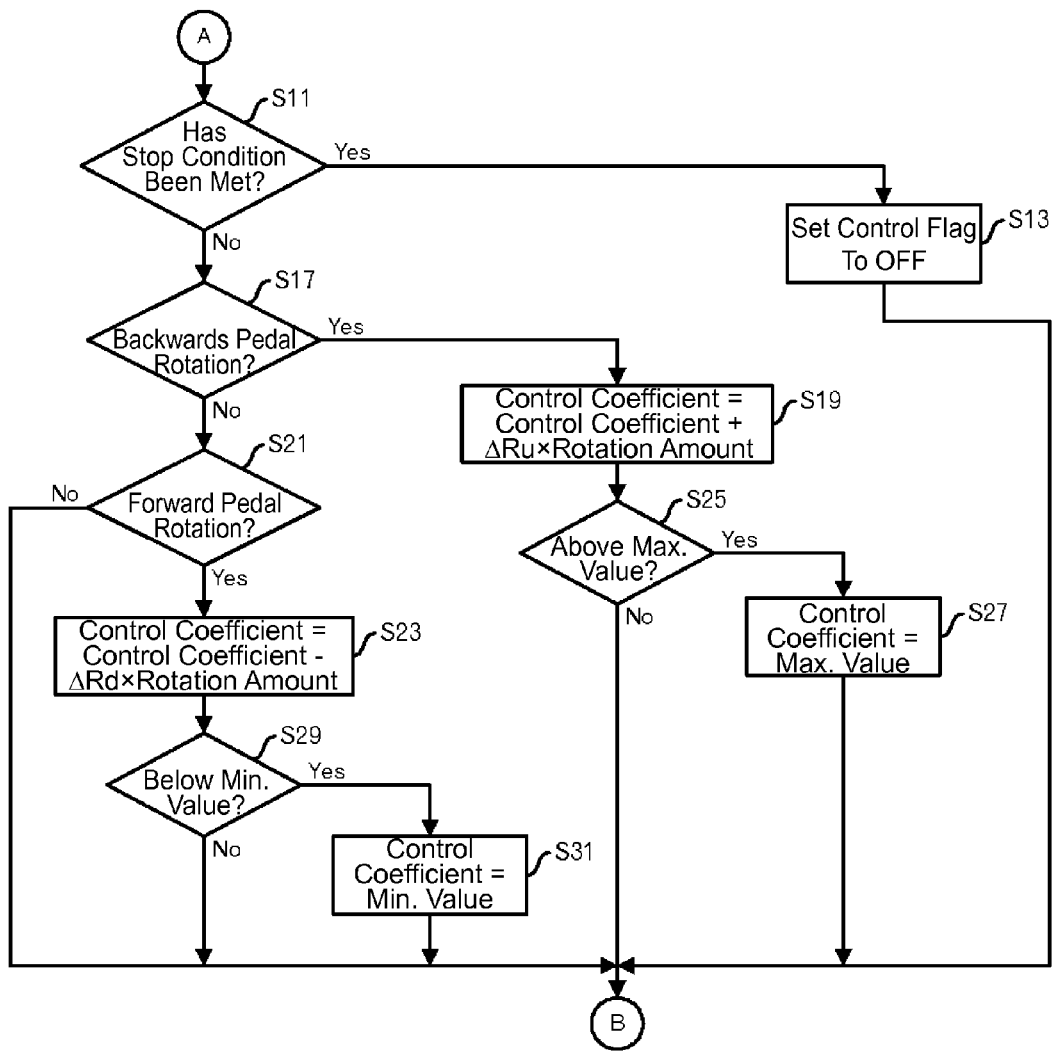
FIG. 12 is a view of a main process flow.
Figure 13:
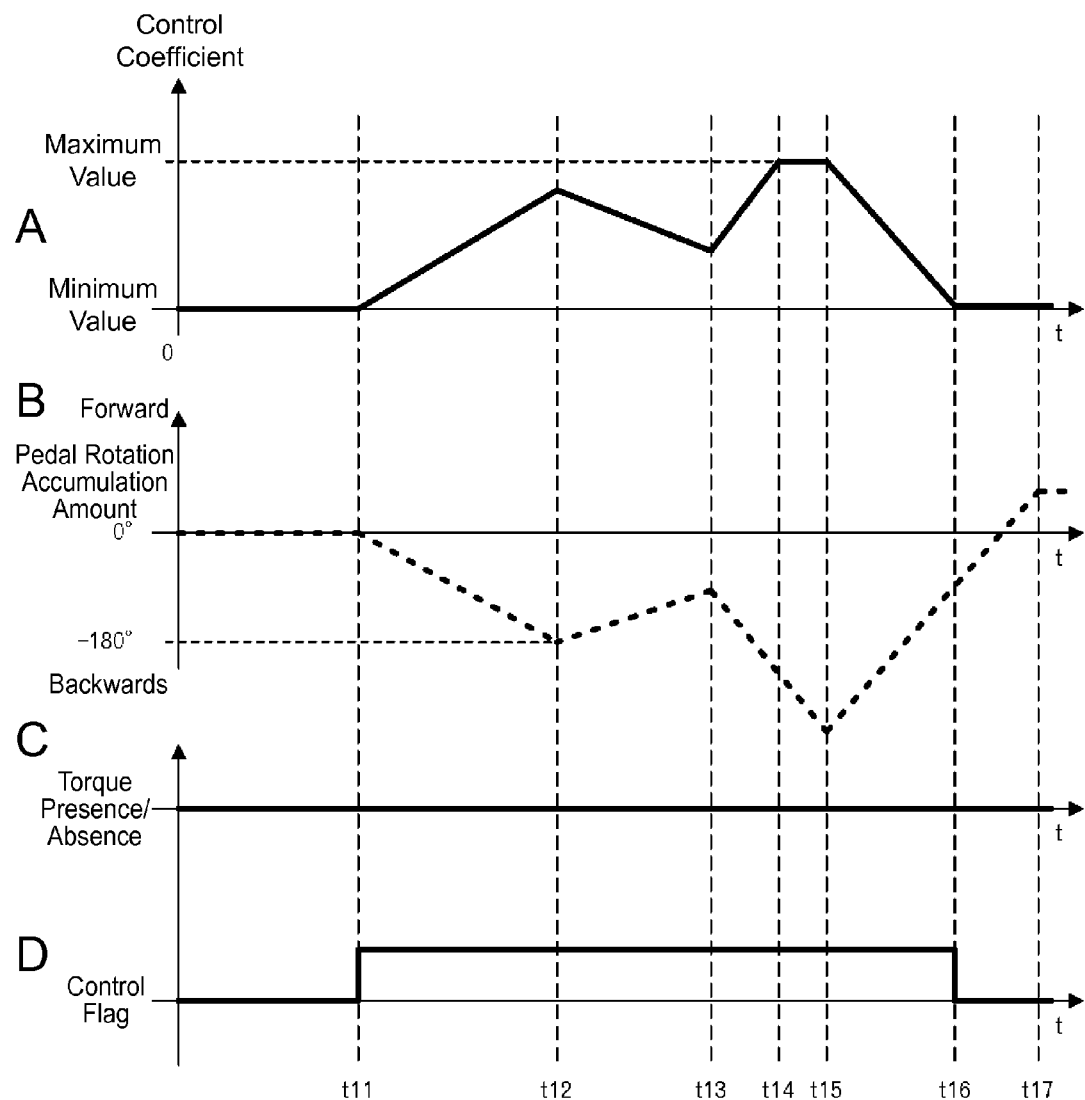
FIGS. 13A to 13D are views of examples of regenerative control.
Figure 14:
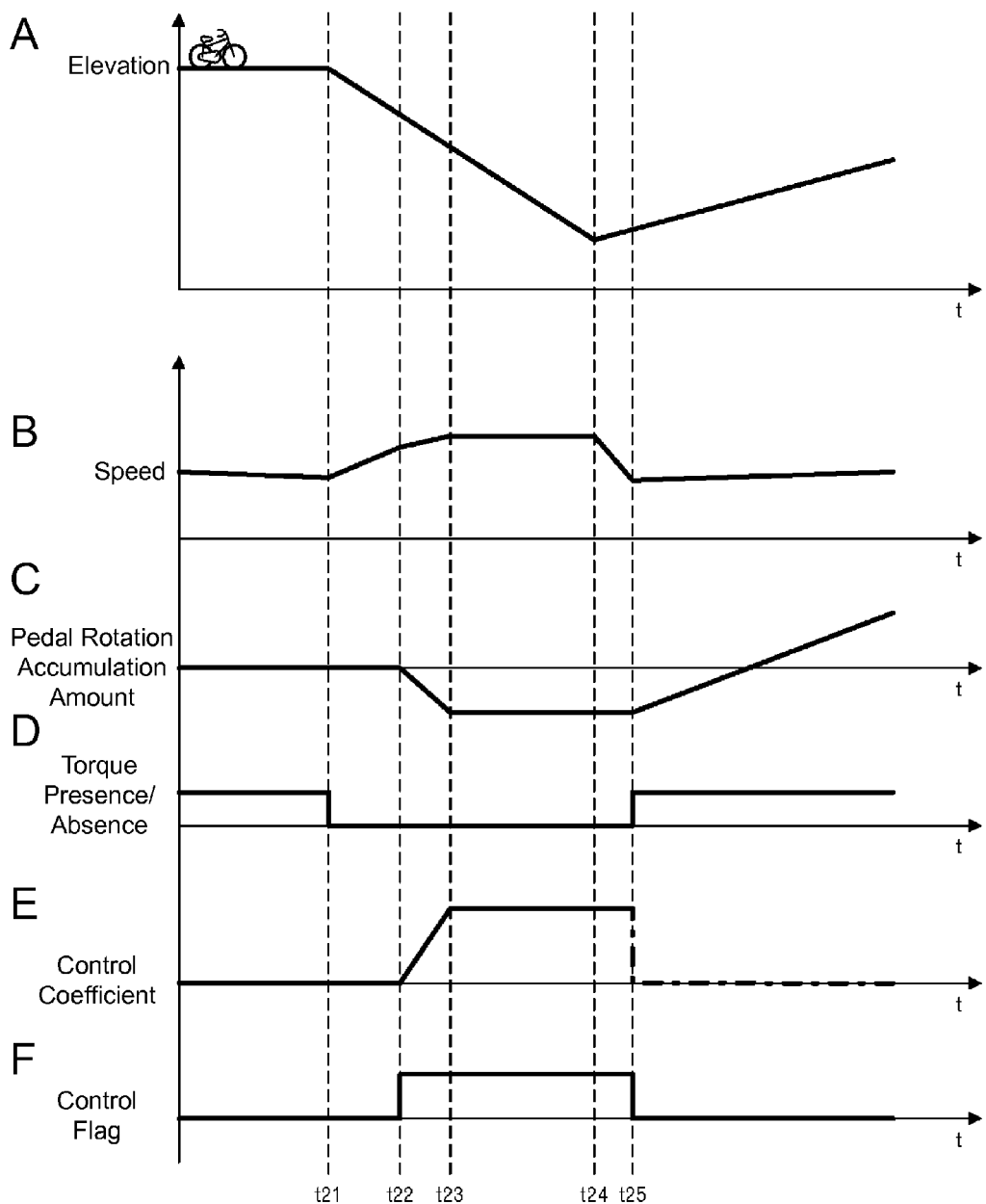
FIGS. 14A to 14F are views of examples of regenerative control.
Figure 15:
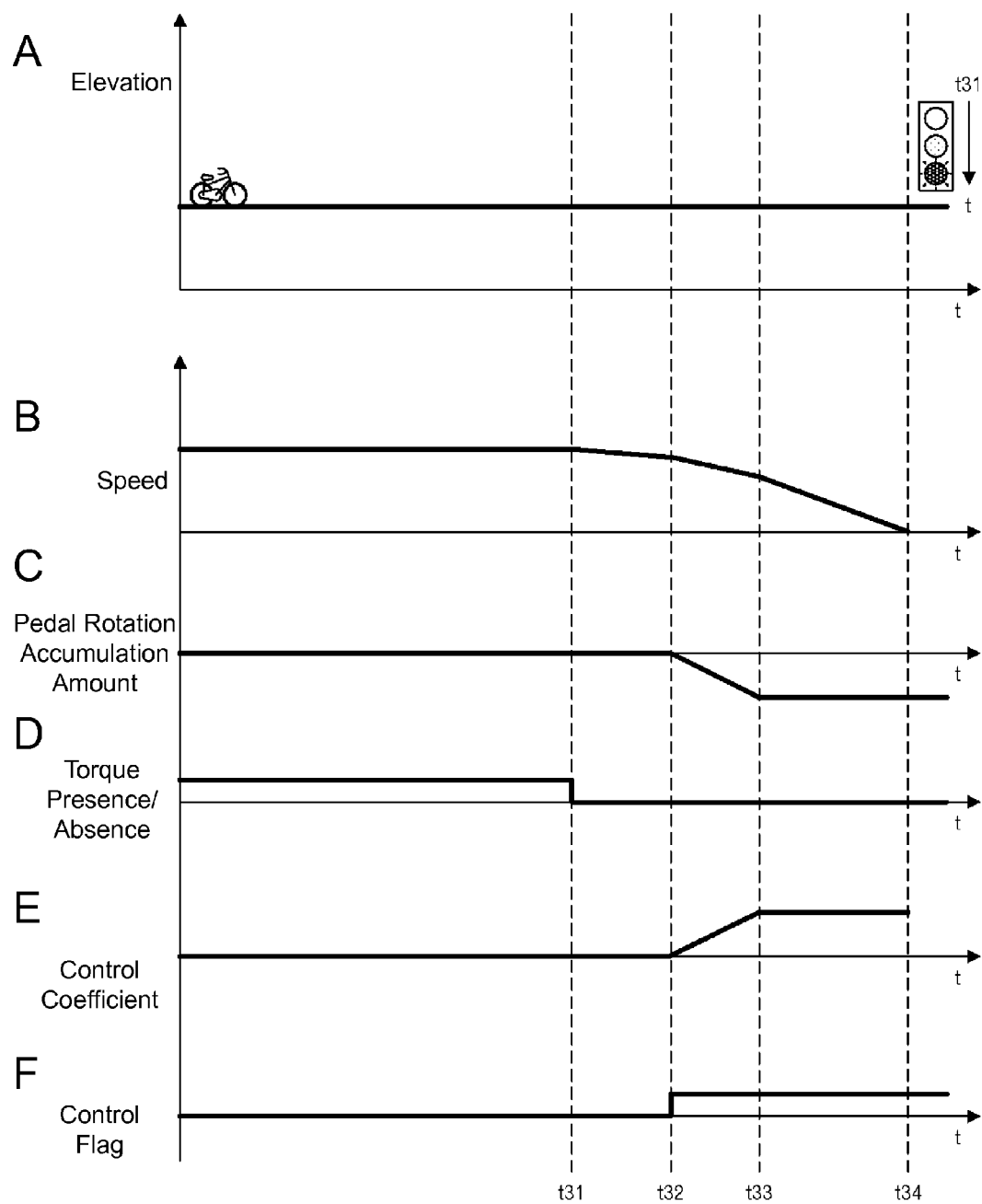
FIGS. 15A to 15F are views of examples of regenerative control.

Moving onto the explanation of the processes in FIG. 12, the control coefficient calculation unit 1210 determines whether a stop condition for regenerative control has been met (step S11). The stop condition for regenerative control is receiving the signal from the torque input unit 1027 indicating the presence of torque, or the control coefficient becoming the minimum value (0, for example). This is because, from the viewpoint of burdening the rider, it is inappropriate to perform regenerative control if there is torque. Furthermore, once the control coefficient becomes the minimum value, the pedal is in a state of forward rotation, and preparing for future backwards rotation of the pedal.

If the stop condition for regenerative control has been met, then the control coefficient calculation unit 1210 sets the control flag to OFF (step S13). If torque has been detected, the control coefficient value will remain unchanged, but the control activation final determination unit 1211 chooses whether to output the value unchanged or to set the value to the minimum value (0, for example). Thereafter, the process returns to step S9 in FIG. 11 via a terminal B.

Meanwhile, if the stop condition for regenerative control has not been met, the control coefficient calculation unit 1210 determines if the signal from the pedal rotation input unit 1023 indicates backwards rotation of the pedal (step S17). If there is backwards rotation of the pedal, the control coefficient calculation unit 1210 updates the control coefficient value by control coefficient+$\Delta Ru \times \Delta$rotation amount (the detected forward rotation phase angle) (step S19). $\Delta Ru$ is a pre-configured increment size. The control coefficient value, however, cannot be increased above a preset maximum value (1, for example). Accordingly, the control coefficient calculation unit 1210 determines whether the control coefficient value exceeds the maximum value (step S25). If below the maximum value, the process returns to step S9 in FIG. 11 through the terminal B. Meanwhile, if above the maximum value, the control coefficient calculation unit 1210 sets the control coefficient to the maximum value of the control coefficient (1, for example) (step S27). This new control coefficient value is outputted to the multiplier 1203. Thereafter, the process returns to step S9 in FIG. 11 via a terminal B.

Meanwhile, if the pedal is not necessarily in backwards rotation, the control coefficient calculation unit 1210 determines whether the signal from the pedal rotation input unit 1023 is indicating forward rotation of the pedal (step S21). If there is forward rotation of the pedal, the control coefficient calculation unit 1210 updates the control coefficient value by control coefficient–$\Delta Rd \times \Delta$rotation amount (the detected backwards rotation phase angle) (step S23). $\Delta Rd$ is a pre-configured decrement size. $\Delta Rd$ may be consistent with $\Delta Ru$ or may not be consistent. The control coefficient value, however, cannot be decreased below a preset minimum value (0, for example). The control coefficient calculation unit 1210 determines whether the control coefficient value is below the minimum value of the control coefficient (step S29). If higher than the minimum value, the process returns to step S9 in FIG. 11 via the terminal B. Meanwhile, if below the minimum value, the control coefficient calculation unit 1210 sets the control coefficient to the minimum value of the control coefficient (step S31). This new control coefficient value is outputted to the multiplier 1203. Thereafter, the process returns to step S9 in FIG. 11 via the terminal B. Meanwhile, if the rotation direction of the pedal is neither backwards rotation nor forward rotation, i.e., the pedal is stopped, the process returns to step S9 in FIG. 11 via the terminal B.

Through processes such as those described above, if the rider rotates the pedal backwards, regenerative control of an amount corresponding to the rotation phase angle of the backwards rotation is performed, and if the pedal is rotated forward, the regenerative control is reduced in an amount corresponding to the rotation phase angle. In other words, if torque has not been detected, the amount of regenerative control can be adjusted through rotation of the pedal.

Next, the examples of regenerative control realized in the process flow shown in FIGS. 11 and 12 are explained using FIGS. 13A to 15F.

FIG. 13A shows change over time for the control coefficient value, FIG. 13B shows change over time for the pedal rotation accumulation amount (the accumulation rotation phase angle of the backwards direction of the pedal), FIG. 13C shows change over time for the presence and absence of torque, and FIG. 13D shows change over time during the control flag (ON or OFF). For the pedal rotation accumulation amount, the bottom expresses the accumulation amount of backwards rotation, and the top expresses the accumulation amount of forward rotation. In practice, there are ripples with respect to the presence or absence of torque, but this has been simplified here to show only presence or absence.

Until time t11, pedal rotation has not been detected and torque has also not been detected. At time t11, backwards rotation of the pedal is detected, and thus, the control flag is set to ON. Thereafter, the pedal backwards rotation accumulation amount increases until time t12, and therefore the control coefficient value increases. At time t12, the pedal rotates forward at a rotation speed with no torque detected, and thus, the pedal backwards rotation accumulation amount decreases until time t13, and the control coefficient value also decreases. Thereafter, at time t13, the pedal again undergoes backwards rotation, and thus the pedal backwards rotation accumulation amount increases, and the control coefficient value also increases. The rotation speed of the pedal after time t13 is greater than the rotation speed of the pedal after time t11; therefore, the pedal backwards rotation accumulation amount rapidly increases. At time t14, however, the pedal backwards rotation amount is still increasing, but the control coefficient value reaches the maximum, and thus is fixed at the maximum value.

Thereafter, at time t15, the pedal undergoes forward rotation at a rotation speed without torque, and thus, the control coefficient value begins to decrease. If forward rotation continues, the control coefficient value at time t16 becomes 0, and the control flag is also set to OFF. The control coefficient value causes backwards rotation of the pedal even after reaching the maximum value; therefore, at time t16, the control coefficient value becomes 0, and the pedal backwards accumulation amount has an offset. This offset, however, occurs when the control flag is OFF, and is thus ignored, and when the pedal is rotated backwards again, is in the state at t11.

FIGS. 14A to 14F shows another scenario. FIG. 14A shows change over time of elevation of the ground on which the electric power-assisted vehicle travels, FIG. 14B shows change over time in speed, FIG. 14C shows change over time in rotation accumulation amount of the pedal, FIG. 14D shows change over time in presence and absence of torque, FIG. 14E shows changeover time of the control coefficient, and FIG. 14F shows change over time of the control flag (ON and OFF). For the pedal rotation accumulation amount, the bottom expresses the accumulation amount of backwards rotation, and the top expresses the accumulation amount of forward rotation. In practice, there are ripples with respect to the presence or absence of torque, but this has been simplified here to show only presence or absence.

FIGS. 14A to 14F shows a scenario in which there is a flat path that leads to a downwards slope and then a gradual upward slope. The path is flat until time t21, and the rider is pedaling with a forward pedal rotation; thus, torque is detected, the control flag is OFF, and the control coefficient is 0. As the descent down the slope begins, the rotation of the pedal is stopped and torque is no longer detected, and the speed increases. Backwards rotation of the pedal is not detected until time t22, however, and thus the control flag is OFF and the control coefficient is also 0. Then, at time t22, when backwards rotation of the pedal is detected, regenerative control begins, the control flag is set to ON, and the pedal backwards rotation accumulation amount increases; therefore, the control coefficient also increases in accordance with this. Regenerative braking then begins to take effect, and an increase in speed is suppressed. At time t23, backwards rotation of the pedal is stopped, and thus the pedal backwards rotation accumulation amount stops changing, the control coefficient stops changing, and the speed is also constant. Then, after having gone down the slope at time t24, there an immediate uphill slope and speed decreases dramatically; thus, the pedal is rotated forward at time t25 in order not to fall over. Due to this, torque will be detected, and thus the control flag turns OFF, and the control coefficient is set to the minimum value (here, 0) by the control activation final determination unit 1211 (see the portion shown by the dashed-dotted line in FIG. 14E). In this manner, if regeneration is continued when torque is detected, the rider will have a heavy burden when starting to ascend the uphill slope, and thus it is preferable that regenerative control be set to OFF immediately when torque is detected.

Another scenario is shown in FIGS. 15A to 15F. FIG. 15A shows change over time of elevation of the ground on which the electric power-assisted vehicle travels, FIG. 15B shows change over time in speed, FIG. 15C shows change over time in rotation accumulation amount of the pedal, FIG. 15D shows change over time in presence and absence of torque, FIG. 15E shows change over time of the control coefficient, and FIG. 15F shows change over time of the control flag (ON and OFF). For the pedal rotation accumulation amount, the bottom expresses the accumulation amount of backwards rotation, and the top expresses the accumulation amount of forward rotation. In practice, there are ripples with respect to the presence or absence of torque, but this has been simplified here to show only presence or absence.

FIGS. 15A to 15F shows a scenario in which the rider recognizes a red light at time t31 while traveling along a flat path and stops forward rotation of the pedal. In other words, torque no longer becomes detected at time t31. Due to this, speed is slightly reduced, but the rider, who has judged that it is not possible to stop quickly before the light, rotates the pedal backwards at time t32. By doing this, the control flag turns ON at time t32 and the backwards accumulation amount of the pedal increases; thus, the control coefficient increases in accordance with this. At time t33, however, the backwards rotation of the pedal stops, and thus the increase of the control coefficient also stops. Due to this, speed gradually decreases due to regenerative braking, and the rider stops at the signal. In this manner, the strength of the regenerative braking is adjusted by the degree of backwards rotation of the pedal, which makes it possible to suitably decrease speed.

The present invention is not limited to the embodiments described above. The control coefficient may be set to the minimum value (0, for example) in accordance with torque detection in Embodiment 1 as it is in Embodiment 2, for example.

In the examples described above, as shown in Japanese Patent No. 5100920, the description assumes that the pedal rotation sensor 107 and the torque sensor 103 are provided separately, but as shown in Japanese Patent Application Laid-Open Publication No. 2012-13626, for example, the pedal rotation sensor 107 may be integrated with the torque sensor 103, and the sensor may have a structure in which the torque is calculated from pedal rotation information.

In the examples described above, the control coefficient is described as being calculated without management of the accumulation rotation amount of the pedal, but the control coefficient corresponding to the accumulation rotation amount of the pedal may be calculated with management of the accumulation rotation amount of the pedal.

A specialized circuit may be used for a part of the computation part 1021, or a microprocessor may execute a program to realize functions such as those described above.

A specialized circuit may be used for a part or all of the controller for driving a motor 102, or a microprocessor may execute a program to realize functions such as those described above.

Figure 16:
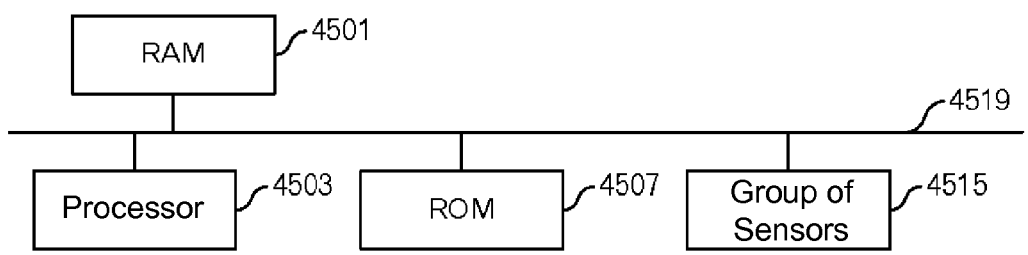
FIG. 16 is a block diagram of functions when using a microprocessor.

In this case, as shown in FIG. 16, the controller for driving a motor 102 has a RAM (Random Access Memory) 4501, a processor 4503, a ROM (Read Only Memory) 4507, and a group of sensors 4515, connected by a bus 4519. The program and, if present, operating system (OS) for running the processes in the current embodiment are stored in the ROM 4507 and read out by the RAM 4501 from the ROM 4507 during execution by the processor 4503. The ROM 4507 also records threshold value and other parameters, and such parameters are also read out. The processor 4503 controls the group of sensors 4515 described above to obtain a measurement. Half-processed data is stored in the RAM 4501. The processor 4503 sometimes contains the ROM 4507, and sometimes contains the RAM 4501. In the embodiment of the present technology, a control program used to run the processes described above may be stored and distributed on a computer-readable removable disk, and written to the ROM 4507 using a ROM writer. Such a computer device realizes each type of function described above by the programs (and sometimes, OS) and hardware mentioned above such as the processor 4503, RAM 4501, ROM 4507 cooperating together organically.

It will be apparent to those skilled in the art that various modification and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A controller for driving a motor in an electric power assisted vehicle with a pedal, comprising:
    a driving control unit that controls driving of a motor; and
    a regenerative control unit that instructs the driving control unit to start regeneration when a signal received from a pedal rotation sensor that detects a rotation direction of the pedal indicates that the rotation direction of the pedal is backwards, said regenerative control unit controlling an amount of the regeneration in accordance with a backward rotation amount of the pedal while said rotation direction of the pedal is backwards, said backward rotation amount being obtained by the pedal rotation sensor,
    wherein the regenerative control unit calculates a regeneration target amount based on a speed of the vehicle and has a control coefficient calculation unit that, after the regenerative control unit instructs the driving control unit to start regeneration, calculates a control coefficient to be applied to the regeneration target amount in accordance with the backward rotation amount of the pedal, the control coefficient being increased as the backwards rotation amount of the pedal increases, and
    wherein the driving control unit controls driving of a motor so as to control regeneration in accordance with the regeneration target amount and the control coefficient.

2. The controller for driving a motor according to claim 1, wherein the regenerative control unit, after instructing the driving control unit to start regeneration, instructs the driving control unit to stop regeneration when a signal received from the pedal rotation sensor indicates that the rotation direction of the pedal is forward.

3. The controller for driving a motor according to claim 2, wherein a slew rate control is applied to the control coefficient so that the control coefficient decreases gradually to zero and the regeneration stops gradually when the regenerative control unit instructs the driving control unit to stop regeneration.

4. The controller for driving a motor according to claim 2,
    wherein a slew rate control is applied to the control coefficient so that the control coefficient is raised gradually to a value determined by the backwards rotation amount of the pedal when the regenerative control unit instructs the driving control unit to start regeneration, and
    wherein a slew rate control is applied to the control coefficient so that the control coefficient decreases gradually to zero and the regeneration stops gradually when the regenerative control unit instructs the driving control unit to stop regeneration.

5. The controller for driving a motor according to claim 1, wherein the regenerative control unit, after instructing the driving control unit to start regeneration, instructs the driving control unit to stop regeneration when a signal received from a torque sensor indicates that torque has been detected.

6. The controller for driving a motor according to claim 5, wherein the pedal rotation sensor is integrated with the torque sensor.

7. The controller for driving a motor according to claim 5, wherein a slew rate control is applied to the control coefficient so that the control coefficient decreases gradually to zero and the regeneration stops gradually when the regenerative control unit instructs the driving control unit to stop regeneration.

8. The controller for driving a motor according to claim 5,
    wherein a slew rate control is applied to the control coefficient so that the control coefficient is raised gradually to a value determined by the backwards rotation amount of the pedal when the regenerative control unit instructs the driving control unit to start regeneration, and
    wherein a slew rate control is applied to the control coefficient so that the control coefficient decreases gradually to zero and the regeneration stops gradually when the regenerative control unit instructs the driving control unit to stop regeneration.

9. The controller for driving a motor according to claim 1, wherein the control coefficient calculation unit decreases the control coefficient in accordance with a rotation amount of the pedal obtained by the pedal rotation sensor when the rotation direction of the pedal obtained from the pedal rotation sensor is forward relative to a position of the pedal that has moved backwards.

10. The controller for driving a motor according to claim 9, wherein the regenerative control unit, after instructing the driving control unit to start regeneration, instructs the driving control unit to stop regeneration when a signal has been received from a torque sensor indicating that torque has been detected.

11. An electric power assisted vehicle, comprising:
the controller for driving a motor according to claim 1;
said motor; and
said pedal.

12. The controller for driving a motor according to claim 1, wherein a slew rate control is applied to the control coefficient so that the control coefficient is raised gradually to a value determined by the backwards rotation amount of the pedal when the regenerative control unit instructs the driving control unit to start regeneration.

* * * * *